(12) United States Patent
Charnesky et al.

(10) Patent No.: US 8,484,900 B2
(45) Date of Patent: Jul. 16, 2013

(54) CONTROL OF AN ACCESS OPENING IN A BODY OF A VEHICLE

(75) Inventors: Scott P. Charnesky, Birmingham, MI (US); James S. Netherland, III, Clarkston, MI (US); Graham J. Spence, Troy, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 0 days.

(21) Appl. No.: 13/198,806

(22) Filed: Aug. 5, 2011

(65) Prior Publication Data

US 2013/0031837 A1 Feb. 7, 2013

(51) Int. Cl.
*E06B 7/28* (2006.01)

(52) U.S. Cl.
USPC ............... 49/316; 49/368; 49/502; 296/146.9

(58) Field of Classification Search
USPC ................... 49/502, 316, 317, 318, 319, 321, 49/366, 367, 368, 371; 296/146.9; 318/266, 318/466
See application file for complete search history.

(56) References Cited

U.S. PATENT DOCUMENTS

| | | | | |
|---|---|---|---|---|
| 2,895,763 A * | 7/1959 | Wernig | ........................ | 296/202 |
| 4,141,179 A * | 2/1979 | Newson et al. | ................. | 49/316 |
| 4,428,153 A * | 1/1984 | Klinger et al. | ................... | 49/366 |
| 6,312,045 B2 * | 11/2001 | Kitagawa | ................... | 296/187.12 |
| 6,895,312 B2 * | 5/2005 | Iida | ....................... | 701/1 |
| 6,913,309 B2 * | 7/2005 | Mikolai et al. | ............. | 296/146.1 |
| 7,059,654 B2 * | 6/2006 | Ichinose | .................... | 296/146.1 |
| 7,320,495 B2 * | 1/2008 | Menke | ........................ | 296/146.1 |
| 7,380,632 B2 * | 6/2008 | Claar et al. | .................... | 180/274 |
| 7,588,116 B2 * | 9/2009 | Kamiya | ........................ | 180/274 |
| 8,123,278 B1 * | 2/2012 | McKenney et al. | ........ | 296/146.9 |
| 8,267,464 B2 * | 9/2012 | Konchan et al. | ........... | 296/146.6 |
| 2002/0073623 A1 * | 6/2002 | Sakamoto et al. | ............. | 49/366 |
| 2011/0125372 A1 * | 5/2011 | Ito | ................................... | 701/45 |
| 2012/0019023 A1 * | 1/2012 | Konchan et al. | ........... | 296/146.9 |
| 2012/0091749 A1 * | 4/2012 | Charnesky et al. | ........ | 296/146.1 |
| 2012/0153678 A1 * | 6/2012 | Konchan et al. | ............. | 296/202 |

* cited by examiner

*Primary Examiner* — Katherine Mitchell
*Assistant Examiner* — Abe Massad
(74) *Attorney, Agent, or Firm* — Quinn Law Group, PLLC

(57) ABSTRACT

A system for controlling an access opening in a vehicle body includes first and second doors arranged to selectively open and close first and second portions of the opening. The system also includes a device operatively connected to the first door and configured to be selectively retracted before at least one of the first and second doors is opened. The device is also configured to be protracted when the first and second doors are closed to thereby seal the first and second portions of the access opening. The system additionally includes a controller configured to selectively retract and protract the device. Furthermore, the system includes a sensor arranged on the vehicle and configured to detect an impact exceeding a threshold intensity on the body and communicate a signal indicative of the impact to the controller. The controller retracts the device upon receipt of the signal from the sensor.

17 Claims, 3 Drawing Sheets

CONTROL OF AN ACCESS OPENING IN A BODY OF A VEHICLE

TECHNICAL FIELD

The disclosure relates to controlling an access opening in a body of a vehicle.

BACKGROUND

A typical vehicle has at least one access door. Such a door typically has a latch mechanism for maintaining the door in a latched or closed state until access into or egress from the vehicle is required. The latch mechanism is typically actuated by an outside door handle to gain access to the interior of the vehicle.

Some vehicles employ multiple side doors for access to the vehicle's interior. Commonly, when viewed from the front of the vehicle, such side doors are hinged proximate their front edge. Vehicles with multiple front-hinged side access doors typically employ a structural pillar, often called a B-pillar, on each side of the vehicle.

There are also vehicles that have multiple side doors, but do not employ a structural pillar between the doors. Instead, such pillar-less vehicles have a largely open space that is selectively covered and uncovered by the access doors. Any gaps remaining between closed access doors may be sealed by supplementary devices whose operation may be controlled manually or be power assisted.

SUMMARY

A system for controlling an access opening in a vehicle body includes first and second doors arranged to selectively open and close first and second portions of the opening. The system also includes a device operatively connected to the first door and configured to be selectively retracted before at least one of the first and second doors is opened. The device is also configured to be protracted when the first and second doors are closed to thereby seal the first and second portions of the access opening. The system additionally includes a controller arranged on the body and configured to selectively retract and protract the device. Furthermore, the system includes a sensor arranged on the vehicle and configured to detect an impact exceeding a threshold intensity on the body and communicate a signal indicative of the impact to the controller. The controller retracts the device upon receipt of the signal from the sensor.

The sensor may be an accelerometer configured to sense the force of the impact. The signal from the accelerometer may be additionally configured to trigger a supplemental inflatable restraint, i.e., an airbag, in the vehicle.

The sensor may be one of a radar, laser, and camera, and be configured to sense an imminent or impending occurrence of the impact. In such a case, the device will be retracted pre-emptively, i.e., prior to the actual impact.

At least partial retraction of the device is required for selective opening and closing of at least one of the first and second doors.

The vehicle body may be characterized by a front end, a rear end, and an absence of a B-pillar. In such a case, the opening may be an entryway on a side of the vehicle, the first portion of the opening may be positioned toward the rear end of the vehicle, and the second portion of the opening may be positioned toward the front end of the vehicle. Additionally, the first door may be rear-hinged and the second door may be front-hinged.

The system may additionally include a detent operatively connected to the device and configured to latch the device to the first door when the device is protracted and release the device from the first door before the device is retracted. The controller may release the device via the detent upon receipt of the signal from the sensor.

The system may also include a detent operatively connected to the device. The detent may be configured to latch the device to the first door when the device is protracted and release the device from the first door before the device is retracted. Accordingly, the controller may release the device upon receipt of the signal from the sensor.

A vehicle employing the above-described system is also disclosed.

The above features and advantages and other features and advantages of the present invention are readily apparent from the following detailed description of the best modes for carrying out the invention when taken in connection with the accompanying drawings.

DETAILED DESCRIPTION

Figure 1:
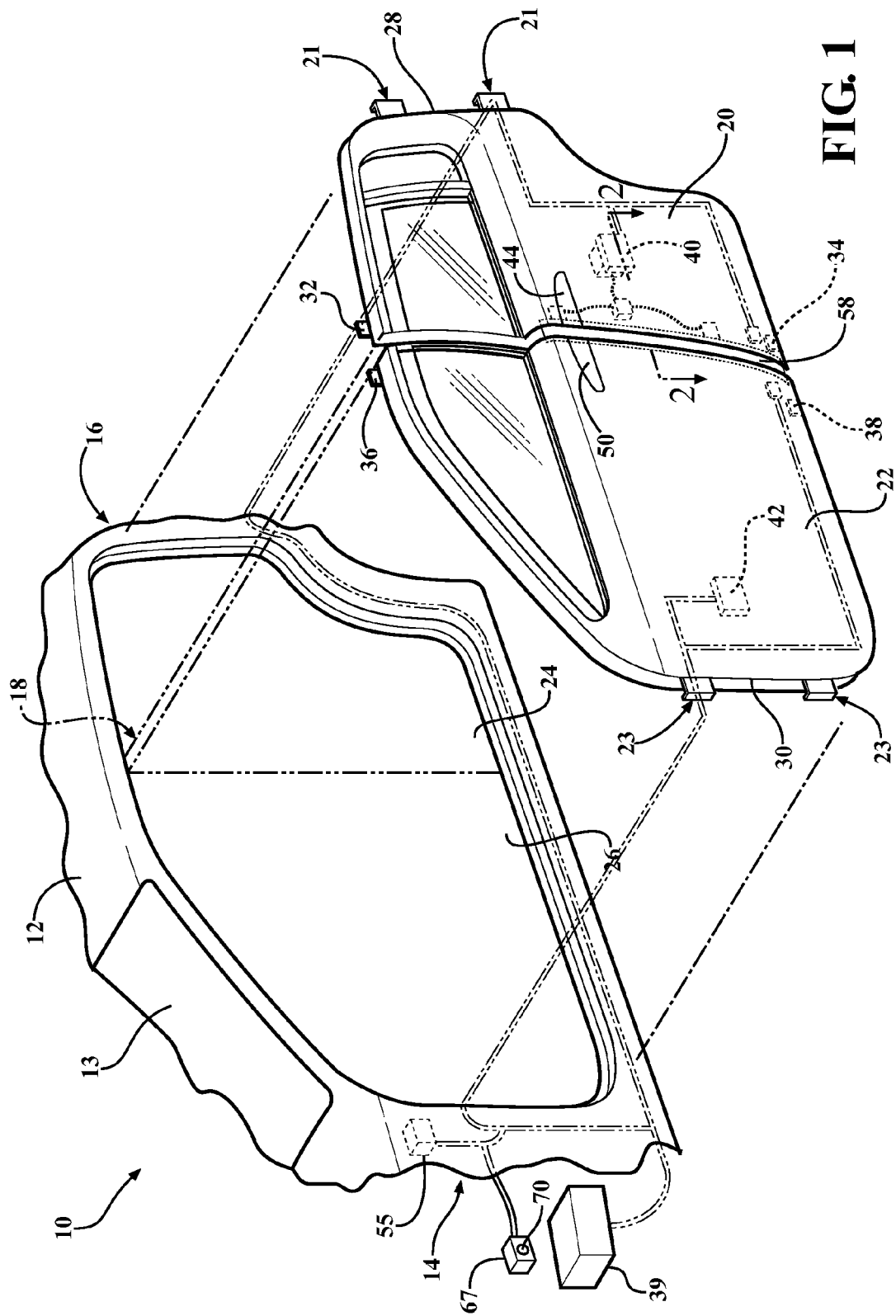
FIG. 1 is a schematic perspective exploded view of a vehicle body illustrating a front-hinged side door and a rear-hinged side door according to an embodiment, with both doors shown in a closed state, along with a primary energy storage device and an auxiliary energy storage device configured to supply back-up power.

Referring to the drawings, wherein like reference numbers refer to like components, FIG. 1 shows a vehicle 10. The vehicle 10 includes a vehicle body 12, as well as openings for windows and various access doors. The body 12 encloses an interior space that is adapted to accommodate vehicle passengers and their belongings. The body 12 includes a front end 14 and a rear end 16 of the vehicle and an access opening 18. The vehicle 10 also includes a system 13 for controlling or selectively opening and closing the access opening 18.

The opening 18 is adapted to provide access into the vehicle passenger compartment, i.e., is an entryway arranged on a side of the vehicle. The system 13 includes two panels, a first side door 20 and a second side door 22, that are configured to cover the opening 18. The first and second side doors 20, 22 are "independently" openable and closable, i.e., each of the first and second doors can be opened or closed regardless of the position of the other vehicle door. Although two side doors 20, 22 are shown, a body 12 adapted to employ fewer or greater number of doors is also envisioned. The opening 18 is characterized by an absence of a B-pillar, and is thus termed "continuous".

A B-pillar is a structural component that is often employed in bodies of vehicles, and is typically used for mounting miscellaneous door and body hardware, such as door hinges and wiring, and to enhance the structure of the vehicle body. Generally, whether the vehicle employs a B-pillar or not depends on the packaging and the intended use of the vehicle. The presence of a B-pillar, although useful for providing a structural benefit, may restrict entry into the vehicle. Thus, an absence of a B-pillar is not unusual in vehicles that employ a tightly packaged passenger compartment along with reduced width side doors, such as compact vehicles, and may also be encountered in work vehicles, such as trucks.

The first side door 20 is arranged to selectively open and close a first portion 24 of the opening 18, and second side door 22 is arranged to selectively open and close a second portion 26 of the opening 18. As configured, the second portion 26 of the opening 18 is a portion of the access opening that may remain uncovered or open when the first portion 24 is covered by the first door 20. The first portion 24 is positioned toward the rear end 16 of the body 12, and the second portion 26 is positioned toward the front end 14 of the body. The first door 20 is pivotably attached to the body 12 via hinges 21 at its rear or trailing edge 28, while the second door 22 is pivotably attached to the body 12 via hinges 23 at its front or leading edge 30. The first door 20 is termed as being rear-hinged, while the second door 22 is termed as being front-hinged. When opened, the first door 20 swings toward the rear end 16 of the body 12, while the second door 22 swings toward the front end 14, and are, thus, arranged as opposite swinging doors.

The system 13 additionally includes a first latch 32, a second latch 34, a third latch 36, and a fourth latch 38. As may be seen in FIG. 1, the first latch 32 is mounted at the top of the first door 20, while the second latch 34 is mounted at the bottom of the first door. Additionally, the third latch 36 is mounted at the top of the second door 22, while the fourth latch 38 is mounted at the bottom of the second door 22. The first and second latches 32, 34 are arranged to selectively latch the first door 20 to the body 12 when the first door is closed, and release the first door to open the first portion 24 of the opening 18. Similarly, the third and fourth latches 36, 38 are arranged to selectively latch the second door 22 to the body 12 when the second door is closed, and release the second door to open the second portion 26 of the opening 18. An electric motor 40 is mounted on the first door 20, while an electric motor 42 is mounted on the second door 22. The latches 32, 34 are releasable on demand by the electric motor 40, while the latches 36, 38 are releasable on demand by the electric motor 42.

The motor 40 is operated via a command received either from a first release mechanism 44 (shown in FIG. 1), such as a lever or a button located on an exterior surface 46 of the first door 20, or via a second release mechanism (not shown) located on an interior surface 48 (shown in FIGS. 2-3) of the first door. Similarly, the motor 42 is operated via a command received either from a third release mechanism 50 (shown in FIG. 1), such as a lever or a button located on an exterior surface 52 of the second door 22, or via a fourth release mechanism (not shown) located on an interior surface 54 (shown in FIGS. 2-3) of the second door.

The system 13 also includes an energy storage device 39, such as a battery. The energy storage device 39 is configured as the main source of electrical power for operating various systems in the vehicle 10, including the vehicle's powertrain and accessories, such as a heating, ventilation, and air conditioning system (not shown). The motors 40 and 42 are each electrically connected to and receive power from the energy storage device 39. The operation of the motors 40 and 42 may be regulated by a controller 55 arranged on the vehicle body 10.

Figure 2:
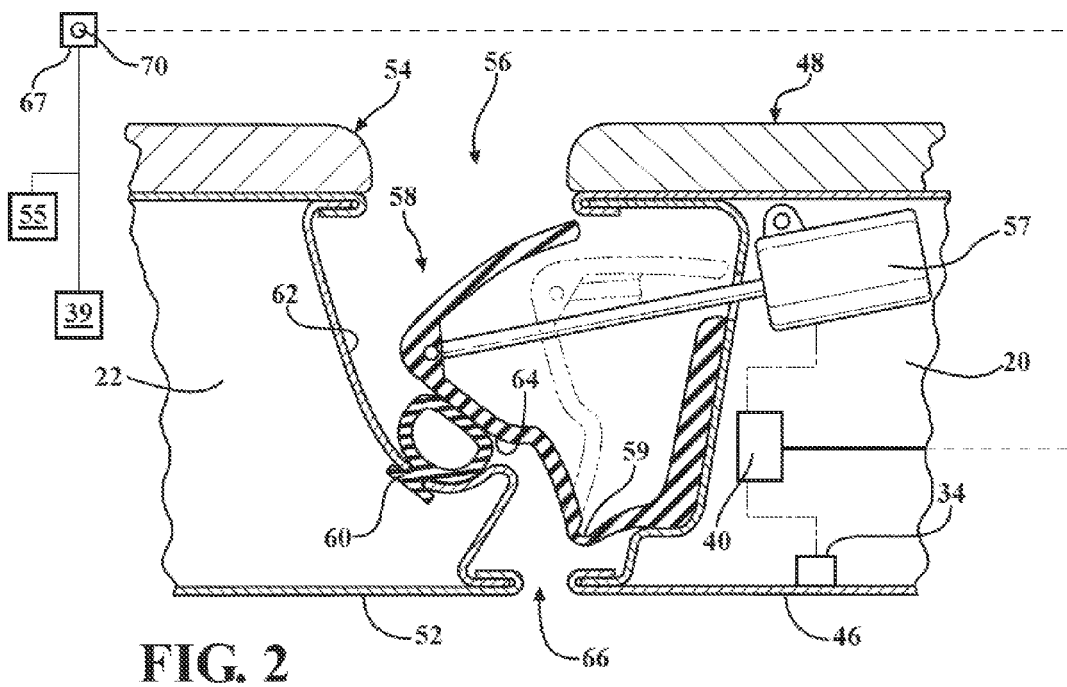
FIG. 2 is a schematic sectional top view of a portion of the side doors taken at line 2-2 of FIG. 1, depicting the side doors in a closed state and a power-activated device in a protracted state for sealing the doors.
Figure 3:
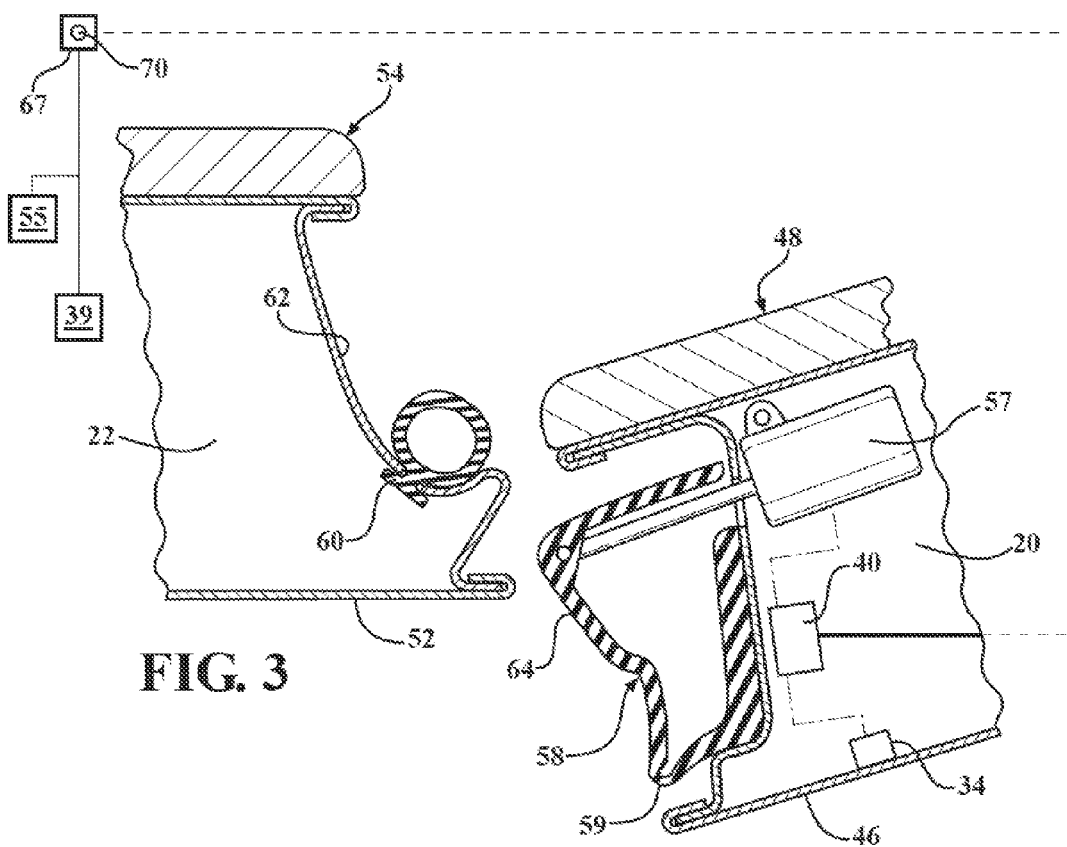
FIG. 3 is a schematic sectional top view of a portion of the side doors shown in FIG. 1, depicting the rear-hinged door in an open state and the front-hinged door in a closed state, and the power-activated device in a retracted state.
Figure 4:
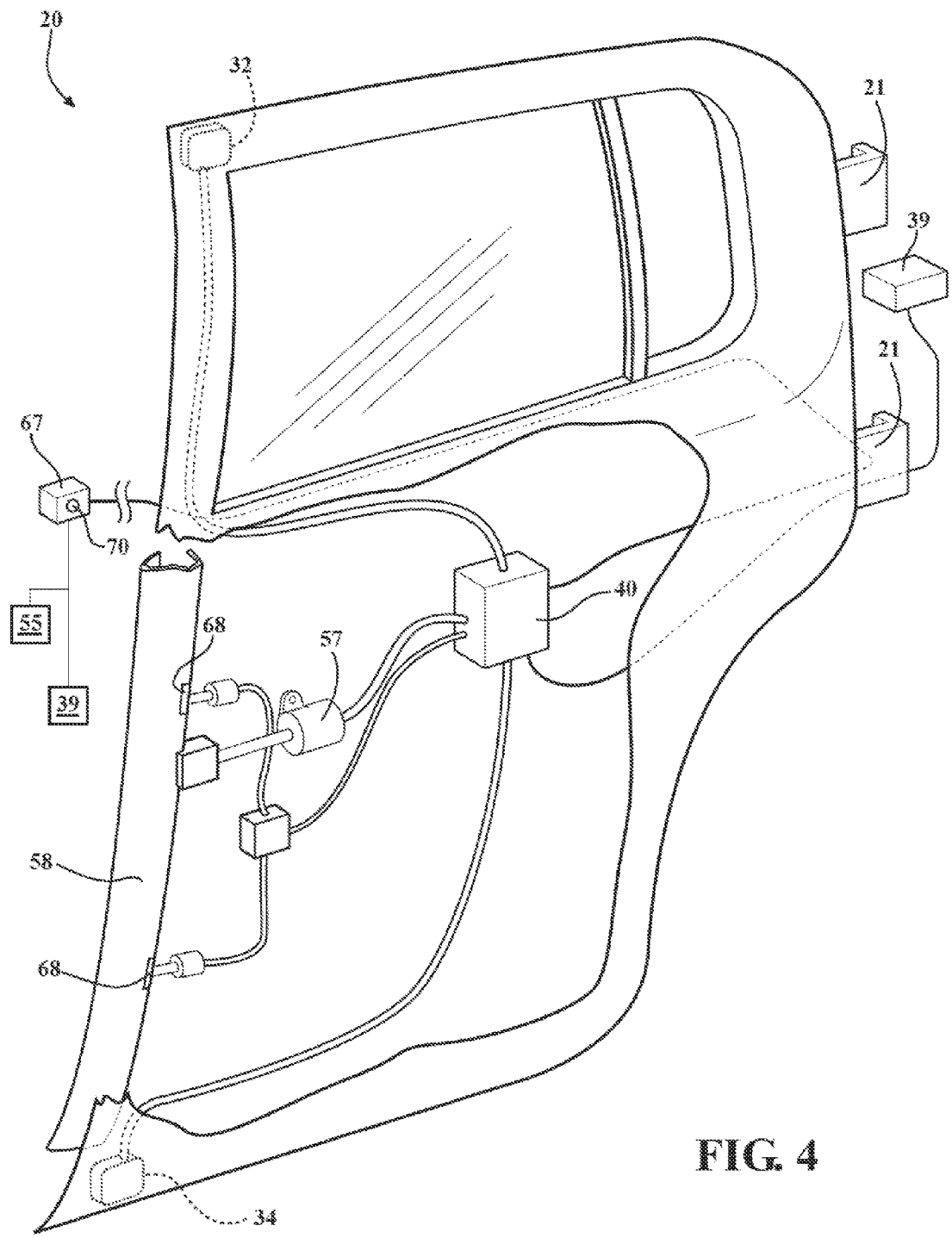
FIG. 4 is a schematic partial cut-away view of the rear-hinged side door shown in FIG. 1, the rear-hinged side door employing the power-activated device and housing the auxiliary energy storage device.

When the doors 20 and 22 are closed, an opening 56 remains there between, as shown in FIG. 2. FIGS. 2-4 show top view of the vehicle body 12, as seen along a cross section 2-2 depicted in FIG. 1. As shown in each of FIGS. 1-3, the system 13 also includes a power-activated device 58 operatively connected to the first door 20 and configured to be selectively retracted before at least one of the first and second doors 20, 22 is opened. The device 58 is also configured to be protracted when the first and second doors 20, 22 are closed to thereby seal the first and second portions 24, 26 of the access opening 18. The articulation of the device 58 is illustrated in FIGS. 2-3, wherein FIG. 2 depicts the first and second doors 20, 22 in a closed state, while FIG. 3 depicts the first door 20 in the process of being opened while the second door remains closed. When the device 58 is protracted, i.e., when both first and second doors 20, 22 are closed, the device covers or fills the opening 56.

The protraction and retraction of the device 58 is accomplished via an actuator 57, which may be an electromechanical device, such as a solenoid. The actuator 57 may also be a mechanism that is set in motion by an electric motor, for example the motor 40 (as shown in FIGS. 2-4). The operation of at least one of the first and third release mechanisms 44, 50 may trigger the actuator 57 to retract the device 58. As shown in FIGS. 2-3, the second door 22 includes a compliant sealing member 60 adapted to be compressed by the device 58 and seal the opening 18 shown in FIG. 1 when the first door 20 and the second door 22 are closed. In the alternative, the sealing member 60 may be operatively connected to the device 58 (not shown), and thus be articulated therewith. The sealing member 60 is a weather strip that is mounted to a side surface 62 of the second door 22.

As shown in FIGS. 2-3, the device 58 includes a surface 64. The surface 64 is adapted to engage and compress the sealing member 60 for seamless contact therewith when the first and second doors 20, 22 are closed. As shown in FIG. 2, when both the first and the second doors 20, 22 are closed, the first and second doors substantially cover the device 58, leaving but a narrow gap 66 between the exterior surfaces 46 and 52. Thus, with the aid of the sealing member 60, when the device 58 is in its protracted position, the device blocks the passage from the gap 66 to the interior surfaces 48, 54. In the event that the sealing member 60 is operatively connected to the device 58, by protracting the device the sealing member may be compressed against the edges of both the first and second doors 20, 22 proximately to the exterior surfaces 46, 52, thus filling the gap 66. The device 58 also fills the opening 56 to protect the interior space of the vehicle 10 from external moisture and dust.

The device 58 includes at least one hinge 59 that is configured to permit the device to be articulated, i.e., protracted or retracted, as necessary. The device 58 may be configured to retract fully to clear the second door 22 when the first door 20 is selectively opened and closed, and be configured to retract at least partially to clear the second door when the first door is selectively opened and closed. As may be seen from FIG. 2, it may be sufficient for the device 58 to retract only partially when the second door 22 is either opened or closed because the interior surface 54 of the second door begins to move away from the device shortly after the second door begins to swing. On the other hand, as may be seen from FIGS. 2 and 3, it may be insufficient for the device 58 to retract only partially when the first door 20 is either opened or closed because the device continues to move toward the exterior surface 52 of the second door during an extended part of its trajectory after the first door begins to swing. Accordingly, full retraction of the device 58 may be required for clearing the second door 22 when the first door 20 is being operated. Also, a construction of the system 13 is envisioned where the device 58 may remain protracted when the first door 20 is maintained closed and the second door 22 is selectively opened and closed.

As noted above, the operation of the motor 40 may be regulated by the controller 55. The controller 55 is additionally programmed to retract the device 58 in the event of an impact on the vehicle 10. To facilitate such a result, a sensor 67 is arranged on the vehicle 10, and, as shown in FIGS. 1-4, is in operative communication with the controller 55. The sensor 67 is configured to detect an impact exceeding a threshold intensity 70 on the body 12 and to communicate a signal indicative of such an impact to the controller 55. In turn, upon receipt of the signal indicative of the impact that exceeds the threshold intensity 70 from the sensor 67, the controller 55 retracts the device 58.

An impact exceeding threshold intensity 70 may be representative of a force having sufficient magnitude to deform the body 12, disrupt various electrical and/or mechanical connections, and immobilize the device 58. Accordingly, in order to ensure vehicle ingress and egress following an impact exceeding the threshold intensity 70, the controller 55 regulates the actuator 57 to retract the device 58 upon the receipt of the signal from the sensor 67. The retraction of the device 58 is intended to occur sufficiently rapidly such that the device will commence to uncover the gap 66 before the force of the impact has spread through the body 12. The threshold intensity 70 of the force of impact on the body 12 may be determined empirically during testing of the vehicle 10.

The sensor 67 may be an accelerometer that is configured to sense the force of an actual impact after such an impact has already commenced. Such an accelerometer may be the same unit that is employed in the vehicle 10 to trigger or deploy a supplemental inflatable restraint in case of an impact that is already in progress. The sensor 67 may also be a radar unit that receives high-frequency radio waves, a laser unit that emits a light beam, or a camera that records/stores images to detect, locate, and track speed of distant objects. Accordingly, in the case of the radar, laser, or camera, the sensor 67 is intended to sense an imminent or impending occurrence of the impact on the vehicle 10 and communicate the signal of an impending impact to the controller 55. In response, the controller 55 will regulate the device 58 to retract preemptively, i.e., prior to the impact.

As shown in FIG. 4, detents 68 may be mounted on the device 58 and be configured to latch or lock the device in the protracted position to the first door 20. The detents 68 are arranged to latch the device 58 to the first door 20 when the device is protracted and are operable to release the device from the first door before the device is retracted. Although two detents 68 are shown in FIG. 4, any number of detents may be used to securely latch the device 58 to the first door 20. As shown, the electric motor 40 may be operatively connected to the detents 68 for releasing the device 58 from the first door 20 in addition to being employed for operating the actuator 57 to selectively protract and retract the device 58. In the event of an impact on the vehicle 10 exceeding the threshold intensity 70, and upon receipt of the signal from the sensor 67 by the controller 55, the electric motor 40 will be activated to operate the detents 68 and release the device 58.

As shown, the device 58 may be mounted on the first door 20. Although not specifically shown, the device 58 may similarly be mounted on the second door 22. The device 58 may also be employed to seal two opposite swinging doors on a rear end of a vehicle, as occasionally used for access to storage compartments in vans, station wagons, and sport utility vehicles (SUVs). In such cases, the device 58 may similarly be retracted by the controller 55 upon receipt of the signal from the sensor 67 indicative of the impact exceeding the threshold intensity 70.

While the best modes for carrying out the invention have been described in detail, those familiar with the art to which this invention relates will recognize various alternative designs and embodiments for practicing the invention within the scope of the appended claims.

The invention claimed is:

1. A system for controlling an access opening in a body of a vehicle, the system comprising:
   a first door arranged to selectively open and close a first portion of the access opening;
   a second door arranged to selectively open and close a second portion of the access opening;
   a device operatively connected to the first door and configured to be selectively retracted before at least one of the first and second doors is opened and protracted when the first and second doors are closed to thereby seal the first and second portions of the access opening;
   a detent operatively connected to the device and configured to latch the device to the first door when the device is protracted and release the device from the first door before the device is retracted;
   a controller arranged on the body and configured to selectively retract and protract the device; and
   a sensor arranged on the vehicle and configured to detect an impact exceeding a threshold intensity on the body and communicate a signal indicative of the impact to the controller;
   wherein the controller retracts and releases the device via the detent upon receipt of the signal from the sensor.

2. The system of claim 1, wherein the sensor is an accelerometer configured to sense the force of the impact.

3. The system of claim 2, wherein the signal from the accelerometer is additionally configured to trigger a supplemental inflatable restraint in the vehicle.

4. The system of claim 1, wherein the sensor is one of a radar, laser, and camera configured to sense an imminent occurrence of the impact.

5. The system of claim 4, wherein the device is refracted prior to the impact.

6. The system of claim 1, wherein at least partial retraction of the device is required for selective opening and closing of at least one of the first and second doors.

7. The system of claim 1, wherein the body is characterized by a front end, a rear end, and an absence of a B-pillar, and wherein:
   the opening is an entryway on a side of the vehicle;
   the first portion of the opening is positioned toward the rear end of the vehicle and the second portion of the opening is positioned toward the front end of the vehicle;
   the first door is rear-hinged; and
   the second door is front-hinged.

8. A vehicle comprising:
   a vehicle body having a front end and a rear end, and defining an access opening; and
   a system for sealing the access opening, the system having:
      a first door arranged to selectively open and close a first portion of the access opening;
      a second door arranged to selectively open and close a second portion of the access opening;
      a device operatively connected to the first door and configured to be selectively retracted before at least one of the first and second doors is opened and protracted when the first and second doors are closed to thereby seal the first and second portions of the access opening;

a detent operatively connected to the device and configured to latch the device to the first door when the device is protracted and release the device from the first door before the device is retracted;

a controller arranged on the body and configured to selectively retract and protract the device; and a sensor arranged on the vehicle and configured to detect an impact exceeding a threshold intensity on the body and communicate a signal indicative of the impact to the controller;

wherein the controller retracts and releases the device via the detent upon receipt of the signal from the sensor.

9. The vehicle of claim 8, wherein the sensor is an accelerometer configured to sense the force of the impact.

10. The vehicle of claim 8, wherein the signal from the accelerometer is additionally configured to trigger a supplemental inflatable restraint in the vehicle.

11. The vehicle of claim 8, wherein the sensor is one of a radar, laser, and camera configured to sense an imminent occurrence of the impact.

12. The vehicle of claim 11, wherein the device is retracted prior to the impact.

13. The vehicle of claim 8, wherein at least partial retraction of the device is required for selective opening and closing of at least one of the first and second doors.

14. The vehicle of claim 8, wherein the body is characterized by a front end, a rear end, and an absence of a B-pillar, and wherein:

the opening is an entryway on a side of the vehicle;

the first portion of the opening is positioned toward the rear end of the vehicle and the second portion of the opening is positioned toward the front end of the vehicle;

the first door is rear-hinged; and the second door is front-hinged.

15. A vehicle comprising:

a body having a front end and a rear end, characterized by an absence of a B-pillar, and defining an access opening on a side of the vehicle; and a system for sealing the access opening, the system having:

a first door arranged to selectively open and close a first portion of the access opening, wherein the first door is rear-hinged and the first portion of the opening is positioned toward the rear end of the vehicle;

a second door arranged to selectively open and close a second portion of the access opening, wherein the second door is front-hinged and the second portion of the opening is positioned toward the front end of the vehicle;

a device operatively connected to the first door and configured to be selectively retracted before at least one of the first and second doors is opened and protracted when the first and second doors are closed to thereby seal the first and second portions of the access opening;

a detent operatively connected to the device and configured to latch the device to the first door when the device is protracted and release the device from the first door before the device is retracted;

a controller arranged on the body and configured to selectively retract and protract the device; and a sensor arranged on the vehicle and configured to detect an impact exceeding a threshold intensity on the body and communicate a signal indicative of the impact to the controller;

wherein at least partial refraction of the device is required for selective opening and closing of at least one of the first and second doors; and wherein the controller retracts and releases the device via the detent upon receipt of the signal from the sensor.

16. The vehicle of claim 15, wherein the sensor is an accelerometer configured to sense the force of the impact and the signal from the accelerometer is additionally configured to trigger a supplemental inflatable restraint in the vehicle.

17. The vehicle of claim 15, wherein the sensor is one of a radar, laser, and camera configured to sense an imminent occurrence of the impact and the device is retracted prior to the impact.

* * * * *